(12) United States Patent
Harding et al.

(10) Patent No.: US 9,481,118 B2
(45) Date of Patent: Nov. 1, 2016

(54) MEDICAL ACCESS DEVICE

(71) Applicant: Becton, Dickinson and Company, Franklin Lakes, NJ (US)

(72) Inventors: Weston F. Harding, Lehi, UT (US); Marty Lee Stout, South Jordan, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 686 days.

(21) Appl. No.: 13/861,223

(22) Filed: Apr. 11, 2013

(65) Prior Publication Data
US 2014/0306383 A1 Oct. 16, 2014
US 2016/0121526 A9 May 5, 2016

Related U.S. Application Data

(62) Division of application No. 11/281,526, filed on Nov. 17, 2005, now abandoned.

(51) Int. Cl.
*B29C 45/14* (2006.01)
*B29C 45/16* (2006.01)
*B29C 45/00* (2006.01)

(52) U.S. Cl.
CPC ........... *B29C 45/14* (2013.01); *B29C 45/0055* (2013.01); *B29C 45/14311* (2013.01); *B29C 45/1676* (2013.01)

(58) Field of Classification Search
CPC ............ B29C 45/14; B29C 45/14311; B29C 45/0055; B29C 45/1676
USPC ............................. 264/328.1, 259, 265, 267
See application file for complete search history.

(56) References Cited

U.S. PATENT DOCUMENTS

| | | | |
|---|---|---|---|
| 5,989,216 A * | 11/1999 | Johnson | A61M 39/0208 604/175 |
| 6,171,287 B1 | 1/2001 | Lynn et al. | |
| 2003/0109853 A1 | 6/2003 | Harding et al. | |
| 2004/0199139 A1 * | 10/2004 | Fowles | A61J 1/1406 604/414 |
| 2007/0112332 A1 * | 5/2007 | Harding et al. | 604/533 |

* cited by examiner

*Primary Examiner* — Christina Johnson
*Assistant Examiner* — Xue Liu
(74) *Attorney, Agent, or Firm* — Jeanne Lukasavage; Craig Metcalf; Kirton McConkie

(57) ABSTRACT

An access device provides needleless access to patient fluid lines such as intravascular catheters. A septum assembly of the access device is formed from a frame integrally molded with a septum and provides access for a tubular portion, such as a male luer taper of a syringe, of a medical device. The frame of the septum assembly is bonded to the housing of the device, which minimizes axial and rotational movement between the septum and the housing, so that the access device properly operates through multiple uses.

6 Claims, 10 Drawing Sheets

MEDICAL ACCESS DEVICE

CROSS REFERENCE TO RELATED APPLICATIONS

This application is a divisional of U.S. patent application Ser. No. 11/281,526 which was filed with the U.S. Patent and Trademark Office on Nov. 17, 2005.

BACKGROUND OF THE INVENTION

1. Field of the Invention

The present invention relates to a connector for accessing patient fluid lines. In particular, the present invention is an access connector that may be opened by a tubular portion of a medical device, such as a male luer taper of a syringe.

2. Description of the Related Art

In the course of treating patients, clinicians are continually transferring patient fluids between various containers and intravascular (IV) lines or through IV catheters. Transfer of these fluids is preferably through a closed system to prevent microbes from entering the system and causing infections in the patients. Many of these closed systems have relied on the use of a needle to penetrate a rubber or silicone septum to gain access to the fluid lines. The clinician may then inject fluid into or withdraw fluid from the patient via a needle and syringe. The septum reseals after the needle is withdrawn, which prevents backflow of the fluids and closes the system once again.

Because of the concern over accidental puncture with needles contaminated with a patient's blood or other fluids, needleless mechanisms have been developed to access patient fluid lines. One such mechanism utilizes a silicone septum that has a slit in it wide enough to allow a standard male luer taper to access the fluids. In this type of mechanism, the silicone septum is encompassed by a thermoplastic housing. With current connectors, the septum is bonded to the housing with adhesive.

Consistent bonding is needed to prevent the septum from rotating within the housing while a male luer-lock taper is locked and unlocked from the connector. In addition, as a male luer taper is drawn out of the septum, the taper tends to stick to the septum and stretches the septum out of the housing. If the septum is not properly bonded to the housing, the septum will pull out, or, as the taper slips off the septum, the septum snaps back into the housing causing fluids to spatter.

SUMMARY OF THE INVENTION

The present invention is an access connector for accessing patient fluid lines. The housing of the connector includes a body and base. A frame is integrally molded to a septum, and the frame is then attached to the top end of the housing. The septum provides a resealable access to the fluid line. The present invention minimizes axial and rotational movement between the housing and the septum to allow optimum performance by the connector.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
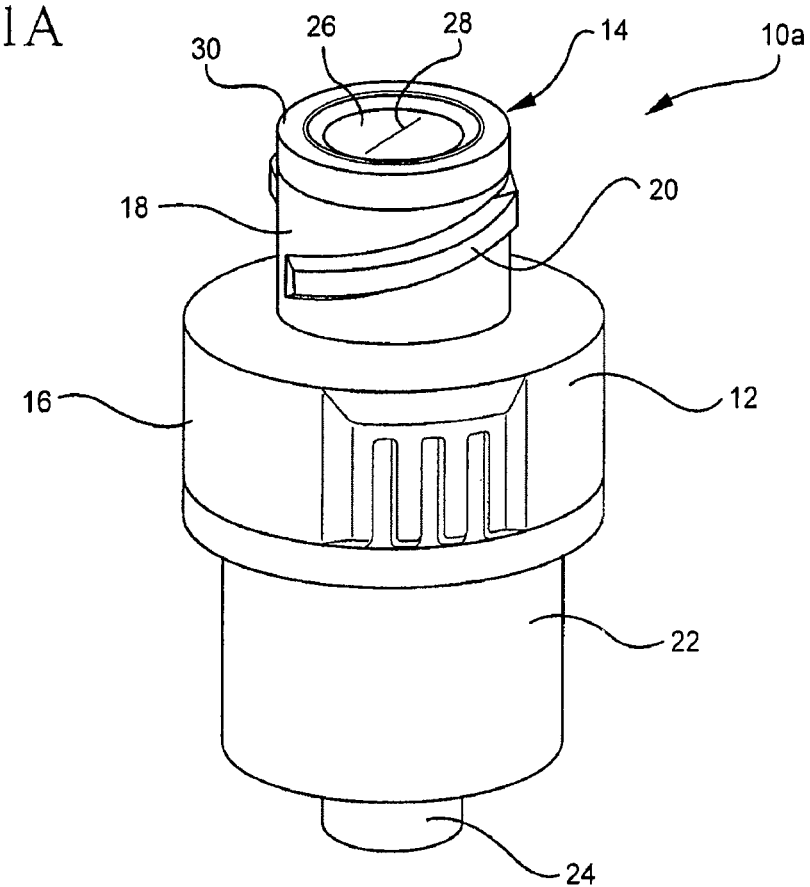
FIG. 1A is a perspective view of a representative embodiment of a first access connector.
Figure 1C:
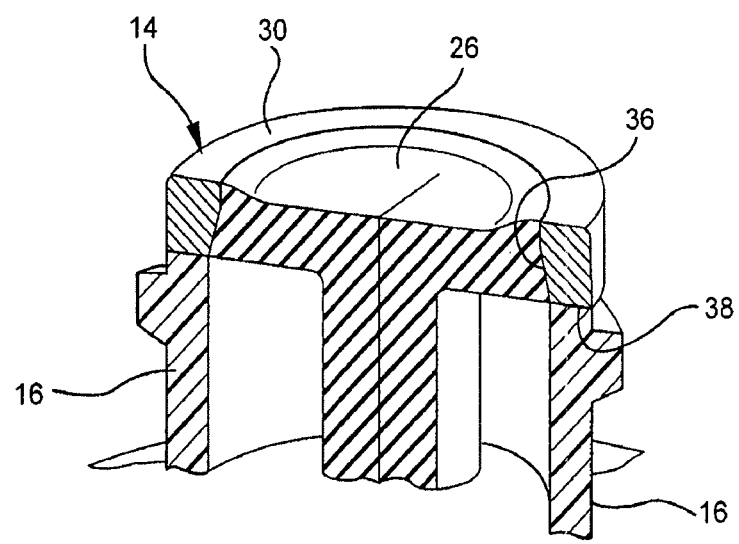
FIG. 1C is a cross-sectional view of the septum, ring and housing of the first access connector.
Figure 1B:
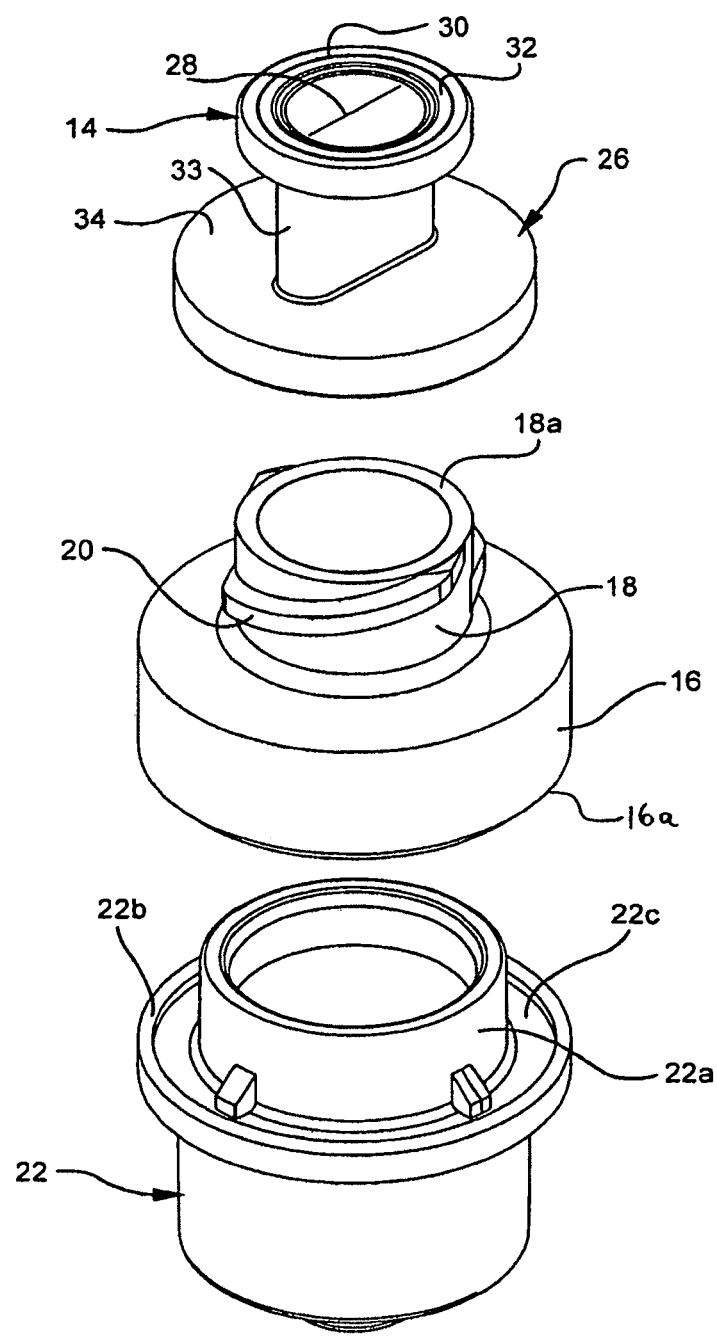
FIG. 1B is an exploded view of the first access connector.

FIGS. 1A-1C show components of a representative embodiment of access connector 10a, which housing 12 and septum assembly 14. Housing 12 includes body 16 with tower 18 and thread 20, base 22 and fluid line port 24. Septum assembly 14 includes septum 26 with slit 28 and frame 30.

Housing 12 and frame 30 are typically made of thermoplastic material such as polycarbonate, polyesters and polycarbonate/polyester blends. Septum 26 can be made from silicone or polyisoprene. A suitable material is adhesive grade liquid silicone rubber. Housing 12, frame 30 and septum 26 may be fabricated from other materials as long as septum 26 is flexible, while housing 12 and frame 30 are relatively rigid.

Frame 30 in FIGS. 1A-1C is a thermoplastic ring that surrounds the top of septum 26. Septum assembly 14 is integrally formed by an injection molding process such as insert molding or multi-shot molding. As a result, septum 26 and frame 30 are bonded together as a part of the molding process.

Tower 18 and body 16 are fabricated as a single piece, typically by injection molding. Frame 30 is attached or bonded to the top end of tower 18. Base 22, which also is typically formed by injection molding, is attached or bonded to the bottom of body 16. Thread 20 extends around the external surface of tower 18, and port 24 is at the bottom of base 22.

In use, connector 10a is connected to a patient fluid line via port 24. The patient fluid line may be any of a number of types such as IV lines, saline wells, arterial lines, hemodialysis lines, etc. When connected, the system remains closed to prevent entry of microbes that could cause infection and back flow of any fluids out of the system. The Q-Syte™ closed luer access device from Becton, Dickinson and Company is an example of a connector that may be assembled according to the present invention.

Connector 10a accepts a tubular portion of a medical device. For example, a medical device having a male luer taper, such as a syringe, is used to infuse or withdraw fluids from the patient fluid line via connector 10a. The male luer taper is inserted into slit 28 of septum 26 and, if the medical device has a luer lock, rotated to interlock the medical device with connector 10a via thread 20. Medical devices that utilize a luer slip can also be used with connector 10a by simply sliding the male luer taper in place. Less typically, connector 10a may be fabricated without thread 20, but then connector 10a could only be used in combination with a luer slip and not a luer lock.

Once the male luer taper is in place, a clinician is then able to either infuse the patient fluid line or draw fluids from it. Medical devices having a luer lock are rotated in the opposite direction and pulled out for withdrawal from septum 28, while medical devices having a luer slip are simply pulled out. Frame 30 is shaped to compress septum 26 such that slit 28 closes tightly. (This is discussed below in more detail.) The system remains closed, and the risk of entry by microbes or leakage of contaminated fluids is minimized. In addition, there is no threat of accidental needle sticks.

As described above, the male luer taper must be inserted into, withdrawn from and rotated within septum 26, and connector 10a must be able to perform optimally after multiple insertions and withdrawals. Because septum 26 and frame 30 are bonded together, and frame 30 is bonded to housing 12, axial and rotational movement of septum 26 relative to housing 12 is minimized. For instance, the integral bond between septum 26 and frame 30 minimizes snapback, which was previously discussed.

With current connectors, frame 30 and body 16 are fabricated as a single piece and then assembled with septum 26 and base 22 to form a connector. However, that configuration does not allow septum 26 to be molded directly into housing 12.

FIG. 1B is an exploded view of a representative embodiment of connector 10a. In addition to the structures identified in FIG. 1A, FIG. 1B shows top disk 32, column 33 and bottom disk 34 of septum 26, rim 18a of tower 18, bottom edge 16a of body 16 and wall 22a, lip 22b and slot 22c of base 22.

In the present invention, frame 30 and top disk 32 of septum 26 are attached during an injection molding process. The injection molding process is typically carried out in one of two ways, either by insert molding or multi-shot (e.g. two-shot) molding. This molding process involves two dissimilar materials that are being brought together into one molding operation.

For insert molding, the thermoplastic material used for frame 30 is rigid at room temperature and melted just prior to injecting under pressure into a mold. The thermoplastic material cools and solidifies taking the shape of the mold cavity. Once cooled, frame 30 is de-molded.

Frame 30 is then inserted into a mold cavity shaped for the formation of septum 26. A two-component silicone is injected into the heated septum-shaped mold cavity under pressure. The two components, which are liquid at room temperature, contact the hot mold, and react and solidify taking the shape of the mold cavity, and the interface between frame 30 and top disk 32 fuse together. Septum assembly 14 is de-molded while still hot and allowed to cool outside of the mold.

Frame 30 may also be pretreated prior to the overmolding process to strengthen the bond. Some examples of pretreatment include passing over an open flame, exposing to ultraviolet light, exposing to plasma or electrical energy and coating with chemical primers.

For two-shot molding, molten thermoplastic material is injected under pressure into a ring-shaped mold cavity and allowed to at least partially solidify to form frame 30. The mold system is then adjusted by exchanging one of the mold halves such that frame 30 is within and partially defines a septum-shaped mold cavity. Silicone, as described above, is then injected into the septum-shaped mold cavity and solidified. Septum assembly 14, formed by the combination of frame 30 fused to septum 26 is de-molded from the septum-shaped mold cavity.

After septum assembly 14 has been formed by insert molding or two-shot molding, bottom disk 34 of septum 26 is collapsed and inserted through tower 18. Bottom disk 34 opens up within body 16, and frame 30 rests on rim 18a. Frame 30 may be attached to tower 18 by any of a number of ways such as by ultrasonic welding, solvent bonding, adhesive bonding, etc. Frame 30 and tower 18 readily bond, because they are fabricated from the same or same class of materials.

As previously noted, frame 30 is a ring shaped such that it exerts a compressive force on septum 26 to bias slit 28 closed. Specifically, frame 30 is deformed by applying a small force on opposing sides that cause it to take on an elliptical shape. Frame 30 is then positioned relative to slit 28 such that the longitudinal axis of slit 28 is aligned with the longitudinal, uncompressed axis of frame 30.

Deforming frame 30 is relatively easy, because its small size makes it quite malleable. A slight force applied on each side of frame 30 is enough to deform it into the elliptical shape. After being overmolded with septum 26, frame 30 may be deformed prior to or as it is being attached to tower 18. Because tower 18 is much more rigid, it will maintain frame 30 in the elliptical configuration after they are bonded together.

To finish connector 10a, bottom edge 16a of body 16 is placed into slot 22c of base 22. Because body 16 and base 22 are fabricated from the same or same class of material, they are readily bonded by any of a number of ways such as ultrasonic welding, solvent bonding, adhesive bonding, etc. As seen in FIG. 1B, the components of housing 12 create a channel through connector 10a. Septum 26 acts as resealable seal that allows fluid to pass through when septum 26 is opened by a tubular portion of a medical device.

The bonded parts are shown in more detail in FIG. 1C. FIG. 1C shows septum 26 fused to frame 30 at fused interface 36. Frame 30 is, in turn, bonded to tower 18 at bonded interface 38. It should be noted that septum 26 and frame 30 may be altered such that interface 36 is not tapered but instead, is straight.

The present invention improves the manufacture of connector 10a by eliminating the use of adhesive to bond housing 12 and septum 26, which is labor intensive and requires very tight process controls. Thus, restrictions on scaling up to high volume production are reduced. In addition, fused interface 36 is stronger and more consistent than the adhesive bonds. Variations in the configuration of frame 30 may provide additional advantages. For example, the ring may contain reduced cross-sectional areas that allow it to bend in certain directions or geometry that provides mechanical attachment instead of or in addition to the chemical or fused adhesion. Examples of these variations are described below.

Figure 2A:
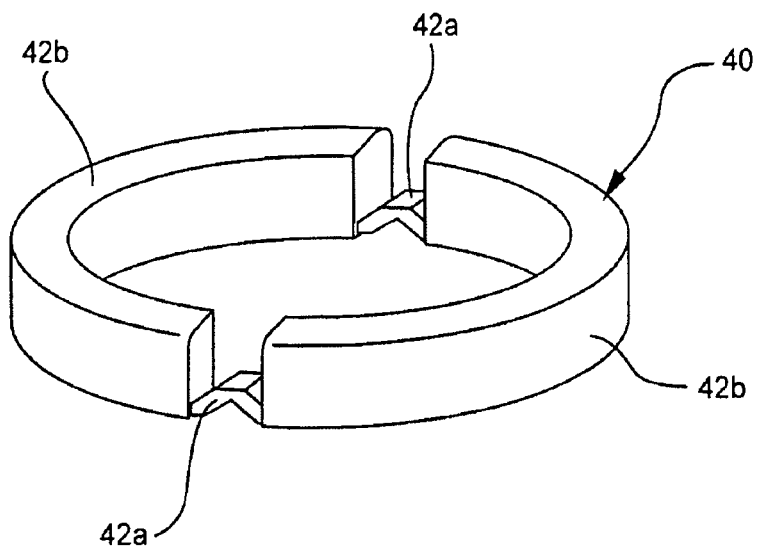
FIG. 2A is a perspective view of the ring of a second access connector.

FIGS. 2A-2D show components of a representative embodiment of access connector 10b. FIG. 2A shows frame 40, which includes compression regions 42a and ring segments 42b. Compression regions 42a have a reduced cross-section relative to arms 42b. This makes compression regions 42a relatively weak and allows frame 40 to strategically bend to compress slit 28.

Figure 2B:
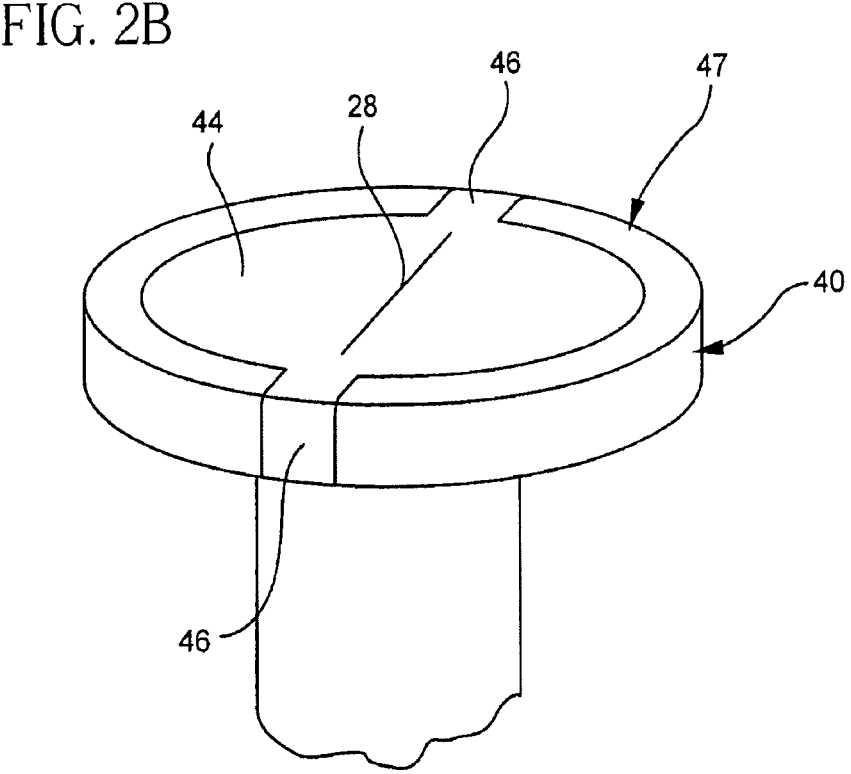
FIG. 2B is a is a perspective view of the integrally molded ring and septum of the second access connector.

FIG. 2B shows frame 40 molded to septum 44 to form septum assembly 47. Septum 44 includes slit 28 and projections 46, which are in line with slit 28. Projections 46 encompass compressed regions 42a and aid in preventing relative rotation between septum 44 and frame 40.

Figure 2C:
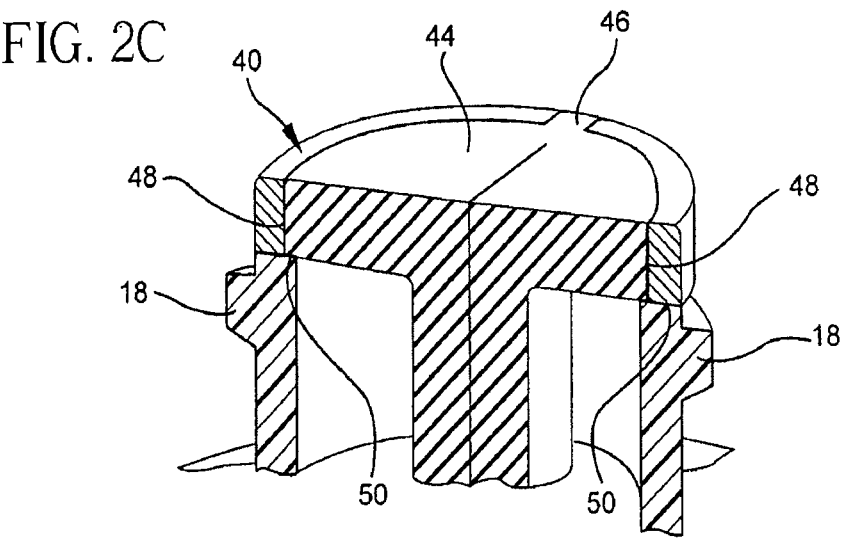
FIG. 2C is a cross-sectional view of the septum, ring and housing of the second access connector.
Figure 2D:
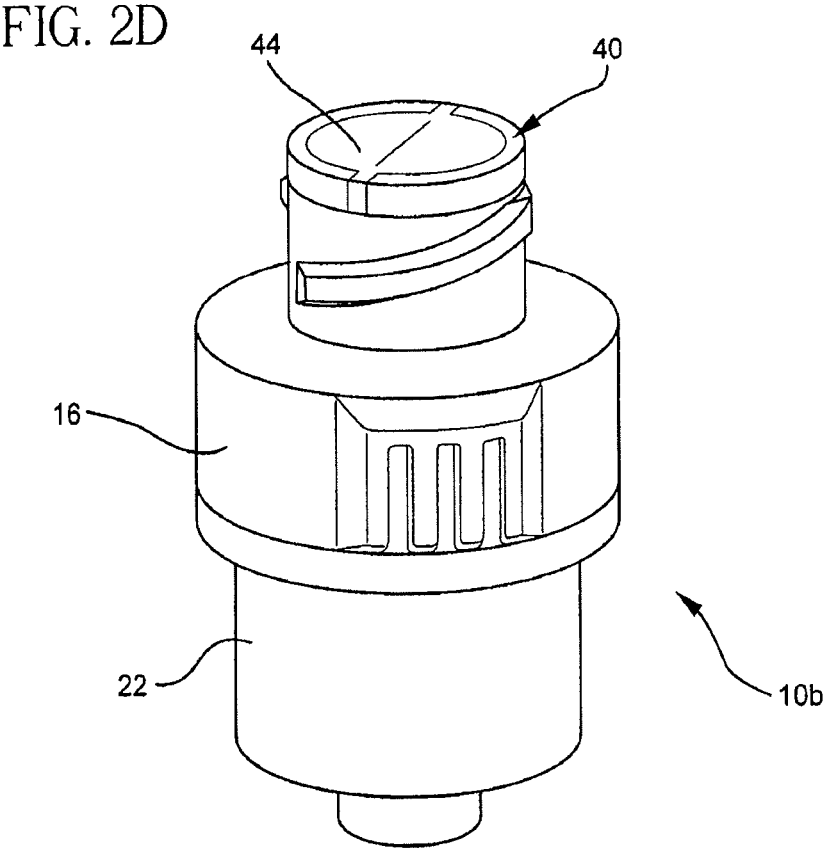
FIG. 2D is a perspective view of a representative embodiment of the second access connector.

FIG. 2C shows the combination of frame 40 and septum 44 attached at rim 18a to tower 18. Fused interface 48 between frame 40 and septum 44 and bonded interface 50 between frame 40 and rim 18a are indicated. The is resulting access connector 10b is shown in FIG. 2D.

Figure 3A:
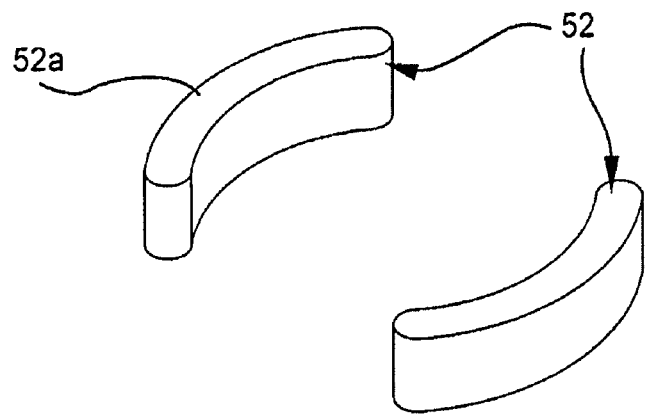
FIG. 3A is a perspective view of the segment of a second access connector.
Figure 3B:
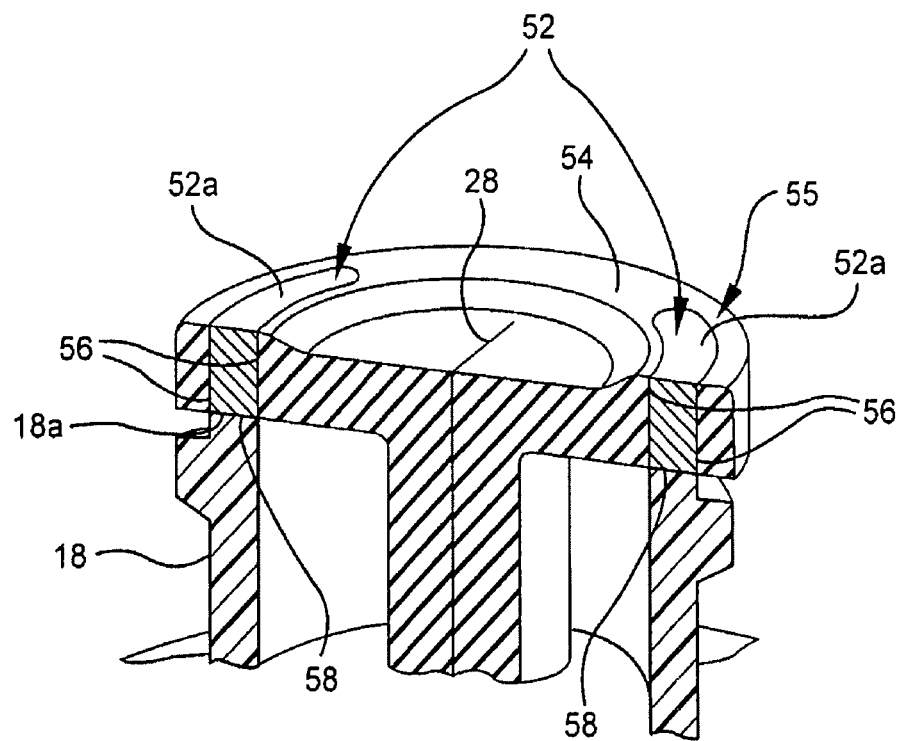
FIG. 3B is a cross-sectional view of the septum, segments and housing of the third access connector.
Figure 3C:
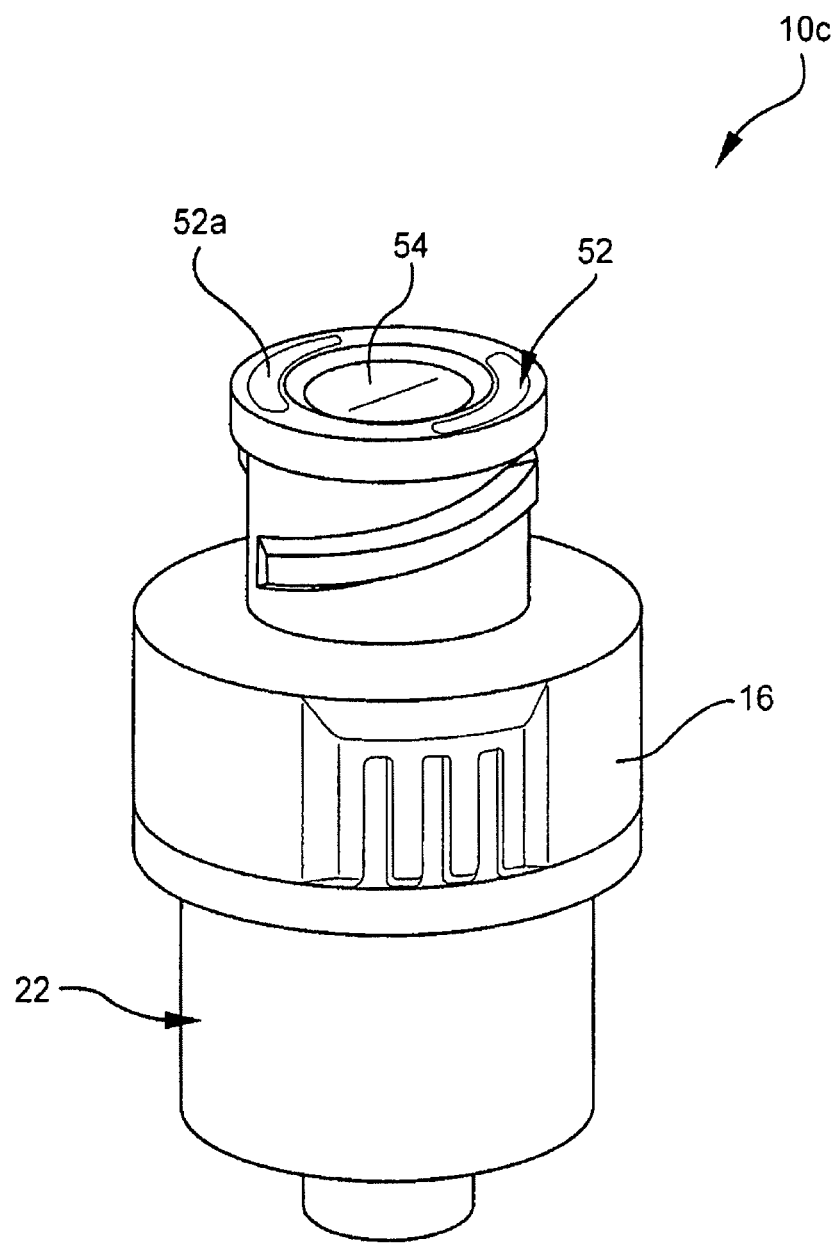
FIG. 3C is a perspective view of a representative embodiment of the third access connector.

FIGS. 3A-3C show components of a representative embodiment of access connector 10c. FIG. 3A shows arc segment 52a, which forms a variation of a frame. Here, instead of a extending all the way around, one or more of arc segment 52a is used.

FIG. 3B shows septum assembly 55 and tower 18. Septum assembly 55 is the combination of two arc segments 52a to form frame 52 and septum 54, which is then attached to rim 18a. Fused interface 56 between frame 52 and septum 54 and bonded interface 58 between frame 52 and rim 18a of housing 12 are indicated. In this embodiment, because septum 54 encompasses much of frame 52, it prevents septum 54 from rotating during use. In addition, frame 52 compresses slit 28 of septum 54 to maintain a closed system. FIG. 3C shows connector 10c assembled with frame 52 and septum 54.

Figure 4A:
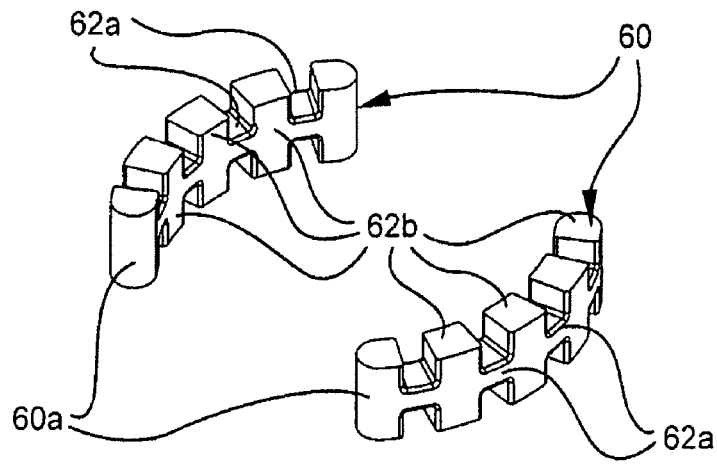
FIG. 4A is a perspective view of the segment of the fourth access connector.
Figure 4B:
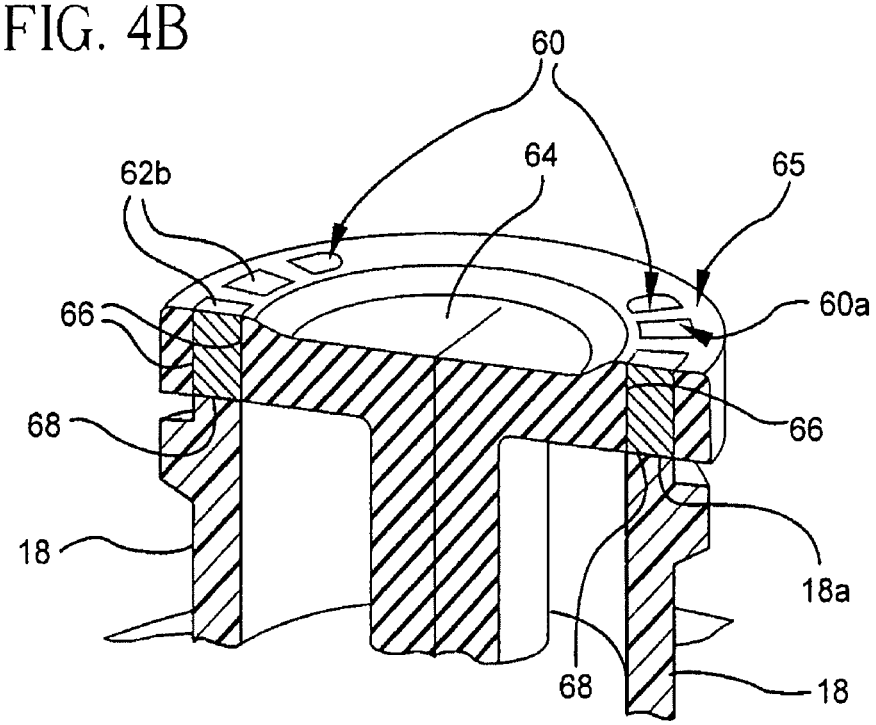
FIG. 4B is a cross-sectional view of the septum, segments and housing of the fourth access connector.
Figure 4C:
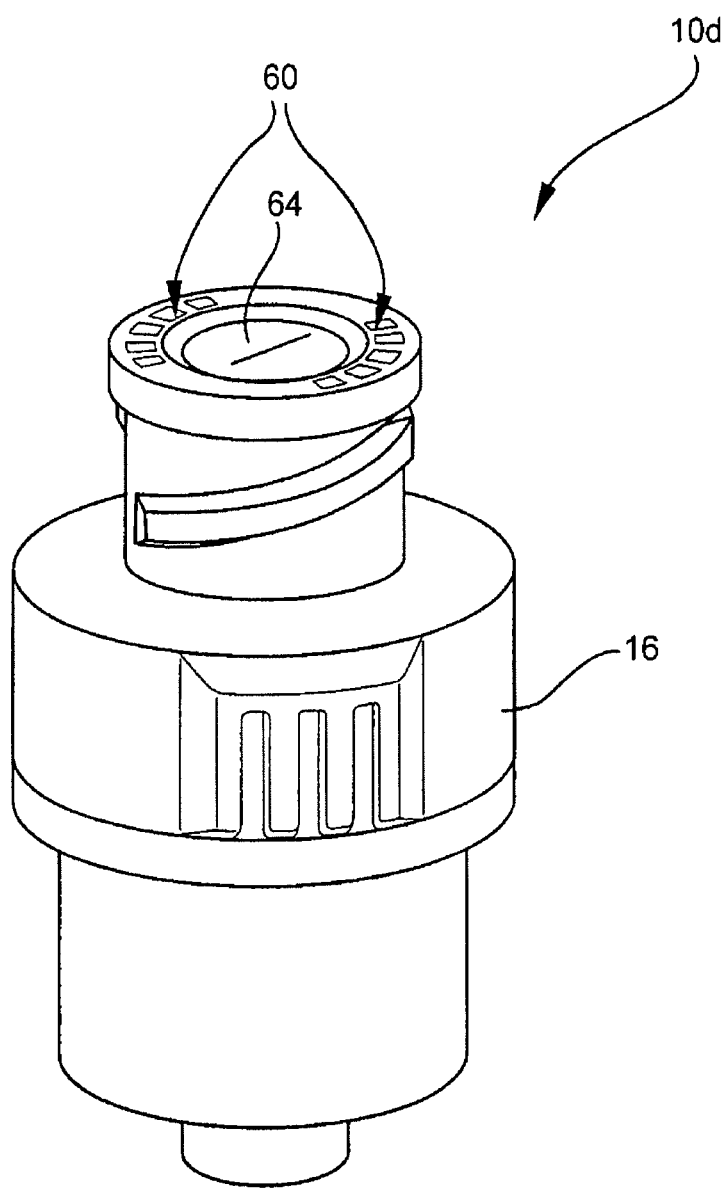
FIG. 4C is a perspective view of a representative embodiment of the fourth access connector.

FIGS. 4A-4C show components of access connector 10d. FIG. 4A shows arc segment 60a. Arc segment 60a includes spine 62a with ribs 62b extending substantially perpendicular from spine 62a. Ribs 62b provide geometry to mechanically attach to a septum. Typically, at least two of arc segment 60a are used to form a frame.

FIG. 4B shows septum assembly 55 and tower 18. Septum assembly 55 is the combination of two arc segments 60a to form frame 60 and septum 64, which is then attached to rim 18a. Fused interface 66 between frame 60 and septum 64 and bonded interface 68 between ribs 62b and rim 18a are indicated.

As noted above, this configuration also provides a mechanical attachment that might be used in addition to or instead of the chemical adhesion. In this example the silicone material solidifies around frame 60 without fusion at the interface between the parts. This may provide enough mechanical attachment for the resulting access connector to properly perform. Additionally, frame 60 will bias slit 28 of septum 64 shut to maintain a closed system. FIG. 4C shows connector 10d assembled with frame 60 and septum 64.

The configurations of frames presented above are only examples. Other geometries may also be used that will impart the advantages of the invention. In another example, arc segments 52a of connector 10c could be connected to each other to form a continuous ring structure. The connecting sections of the ring would have a smaller cross-sectional diameter to form compressed regions that bend in order to bias slit 28 of septum 54. The same type of variation could also be formed with arc segments 60 of connector 10d.

Figure 5:
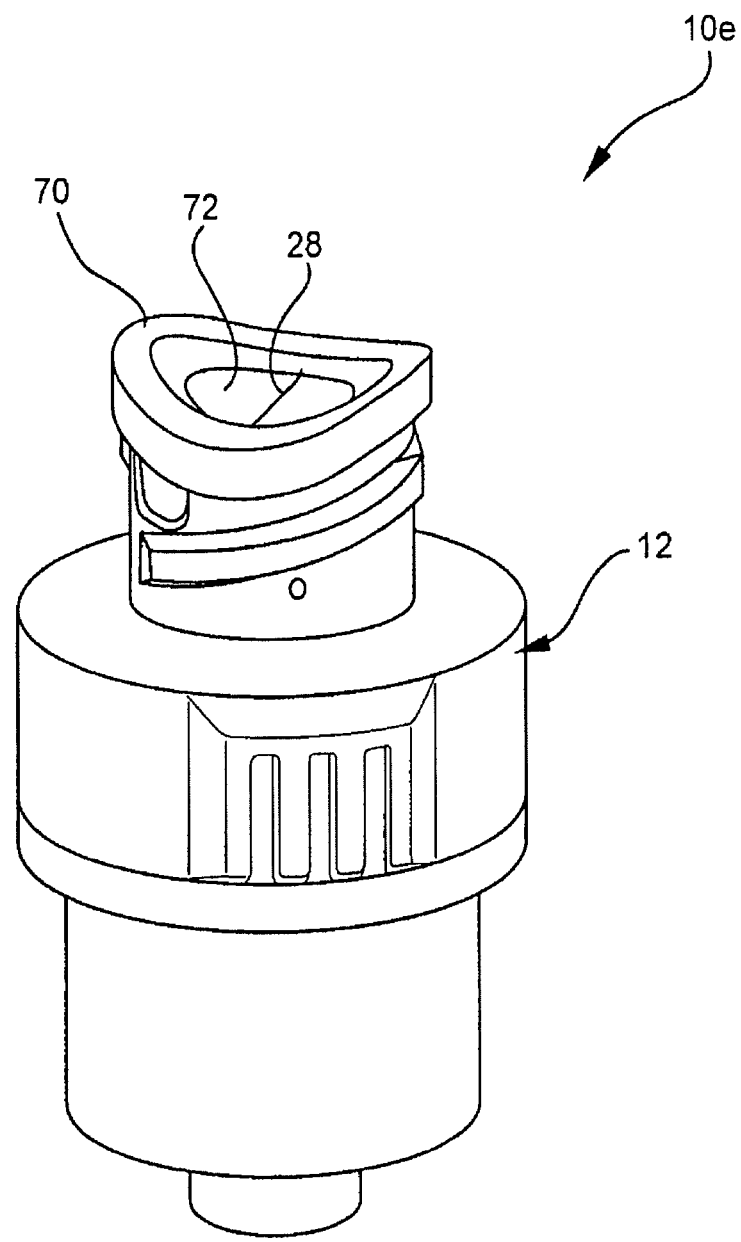
FIG. 5 is a perspective view of a representative embodiment of fifth access connector.

Another variation is shown in FIG. 5, which is a representative embodiment of connector 10e. Connector 10e includes housing 12 with frame 70 and septum 72 with slit 28. Here, frame 70 and septum 72 are similar to frame 14 and septum 26 of connector 10a except that frame 70 and septum 72 have a saddle configuration at the top of device 10e. The saddle provides additional bias to compress slit 28 and may be combined with any configuration of connector 10 to give the advantage of biasing slit 28 closed in order to maintain a closed system.

Figure 6:
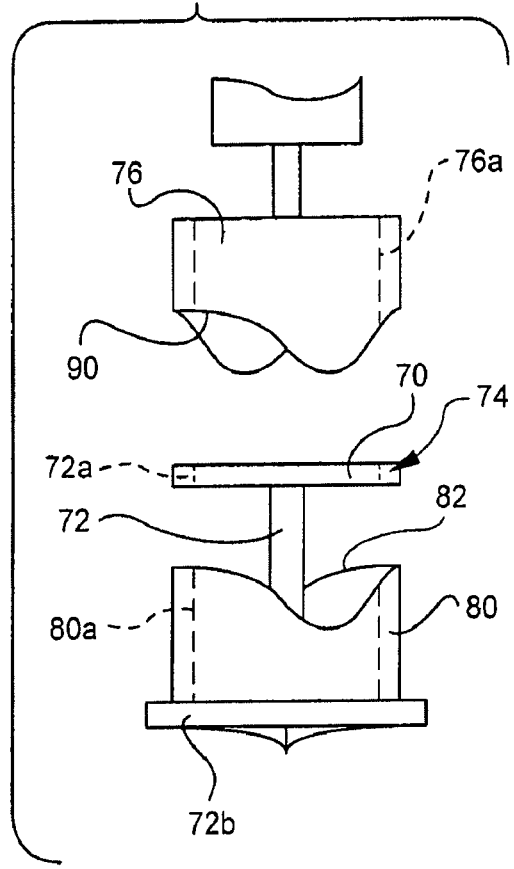
FIGS. 6 and 7 are side views showing a method of deforming a septum assembly.

FIG. 6 shows a method of forming the saddle shape of frame 70 and septum 72 of connector 10e by deforming or shaping frame 70. FIG. 6 shows septum assembly 74 with frame 70 and septum 72, mandrel 76 with inner wall 76a and rim 78 and forming base 80 with inner wall 80a and rim 82. Septum 72 includes top disk 72a and bottom disk 72b.

Mandrel 76 is saddle-shaped along rim 78, heated and coated to have a non-stick surface. Forming base 80 is saddle-shaped along rim 82 in a mating fashion with rim 78 and may or may not be heated and/or coated. Both mandrel 76 and forming base 80 are cylindrical as indicated by inner walls 76a and 80a, respectively, and are sized such that rim 78 and rim 82 only contact frame 70.

Figure 7:
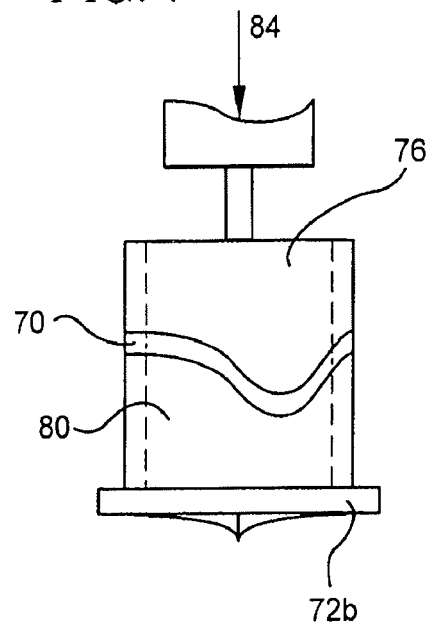

In operation, septum assembly 74 is inserted into forming base 80 such that top disk 72a is over rim 82 and bottom disk 72b is underneath forming base 80. As shown in FIG. 7, when a force is applied to mandrel 76 as indicated by arrow 84, rim 78 is pressed against frame 70, which is in turn pressed against rim 82 of forming base 80. The heat and pressure causes the thermoplastic material of frame 70 to form the saddle shape of mandrel 76 and forming base 80.

Depending on the type of thermoplastic material used to fabricate frame 70, septum assembly 74 may be retained between mandrel 76 and forming base 80 until the part cools in order to maintain the saddle shape. Septum 72 is fabricated from elastomeric silicone, which has a resilient quality, and therefore will have a tendency to return to its original shape. If frame 70 is not stiff enough when hot to hold the saddle shape, then septum assembly 74 will need to remain between mandrel 76 and forming base 80 until cool. On the other hand, if frame 70 is stiff enough when hot it can be removed and allowed to cool without the support of mandrel 76 and forming base 80.

Figure 8:
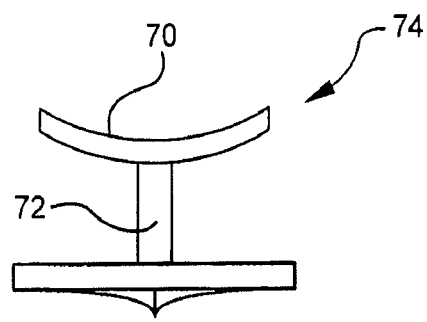
FIG. 8 is a side view of a deformed septum assembly.

FIG. 8 shows septum assembly 74 after being shaped. Septum assembly 74 is subsequently inserted into and attached to housing 12 to form connector 10e.

Molding the septum onto the first section of the housing in access connectors according to the present invention provides several advantages. The attachment between the parts is strong and consistent. In addition, the process overcomes some of the barriers associated with scaling up for high volume production.

Although the present invention has been described with reference to preferred embodiments, workers skilled in the art will recognize that changes may be made in form and detail without departing from the spirit and scope of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of making an access connector in a mold system, the method comprising: forming a thermoplastic frame; injection molding a silicone septum in a septum-shaped mold cavity that is partially defined by the frame so that the septum and frame are integrally molded; attaching the frame to a body of a housing; and pretreating the frame to increase adhesion to the septum, wherein pretreating is one of passing through an open flame, exposing to ultraviolet light, exposing to plasma energy, exposing to electrical energy and coating with a chemical primer.

2. The method of claim 1, wherein the mold system further includes a frame-shaped mold cavity, the method further comprising: injection molding thermoplastic into the frame-shaped mold cavity; and ejecting the frame from the frame-shaped mold cavity.

3. The method of claim 2, and further compromising: inserting the frame into the septum-shaped mold cavity.

4. The method of claim 2, and further comprising: adjusting the mold system such that the frame partially defines the septum-shaped mold cavity.

5. A method of making an access connector in a mold system, the method comprising:
forming a thermoplastic frame, the frame having an inner surface, an outer surface, a proximal surface, and a distal surface;
injection molding a silicone septum in a septum-shaped mold cavity that is partially defined by the frame, the septum comprising a bottom disk formed at a distal end of the septum, a top disk formed at a proximal end of the septum, and a column that couples the bottom disk to the top disk, the top disk being integrally molded with the frame; and
attaching the frame to a housing to form the access connector, the housing comprising a body and a base, the body having a distal end that couples to the base and a proximal end from which a tower extends, the tower forming a proximal opening of a lumen that extends through the housing, a proximal end of the tower forming a rim, wherein attaching the frame to the housing comprises:
positioning the septum within the housing such that the bottom disk is located between the body and the base of the housing and the top disk is positioned proximal to the rim; and
bonding the distal surface of the frame to the rim of the tower thereby maintaining the position of the septum within the housing.

6. A method of making an access connector in a mold system, the method comprising: forming a thermoplastic frame; injection molding a silicone septum in a septum-shaped mold cavity that is partially defined by the frame so that the septum and frame are integrally molded; attaching the frame to a body of a housing; and contacting the frame, after being integrally molded with the septum, with a mandrel and forming base to deform the frame.

* * * * *